United States Patent
Swales et al.

(10) Patent No.: US 8,226,516 B2
(45) Date of Patent: Jul. 24, 2012

(54) ELECTRIC TORQUE CONVERTER WITH DUAL-DRIVEN MAIN PUMP

(75) Inventors: Shawn H. Swales, Canton, MI (US); James M. Hart, Belleville, MI (US); Edward W. Mellet, Rochester Hills, MI (US); Norman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 12/794,817

(22) Filed: Jun. 7, 2010

(65) Prior Publication Data

US 2011/0300990 A1 Dec. 8, 2011

(51) Int. Cl.
*F16H 3/72* (2006.01)
*F16H 37/06* (2006.01)
*F16H 47/04* (2006.01)

(52) U.S. Cl. .................. 475/5; 475/72; 475/73
(58) Field of Classification Search ............. 475/5, 72, 475/73; 60/330
See application file for complete search history.

(56) References Cited

U.S. PATENT DOCUMENTS

| | | | | |
|---|---|---|---|---|
| 6,663,525 | B1 * | 12/2003 | McKee et al. | 475/72 |
| 6,692,395 | B2 * | 2/2004 | Rodeghiero et al. | 475/77 |
| 6,984,172 | B2 * | 1/2006 | Talbi et al. | 460/59 |
| 7,207,916 | B2 * | 4/2007 | Rodeghiero et al. | 475/78 |
| 7,241,242 | B2 * | 7/2007 | Schmidt | 475/72 |
| 2005/0043133 | A1 * | 2/2005 | Weeramantry | 475/72 |

* cited by examiner

Primary Examiner — David D Le
Assistant Examiner — Colby M Hansen
(74) Attorney, Agent, or Firm — Quinn Law Group, PLLC

(57) ABSTRACT

A vehicle includes an electric motor/generator unit (MGU), an internal combustion engine, a transmission having an input member rotatable by the engine or the MGU, and an electric torque converter assembly. The torque converter assembly has a pump in driving connection with the transmission, a braking clutch assembly for selectively connecting the engine to a stationary member, a lockup clutch, and a dual-pinion planetary gear set. The electric torque converter assembly allows inertia torque from the MGU to transfer through the gear set to assist engine cranking when the MGU is decelerating. The pump is driven by the faster of the engine and MGU via the gear set and selective engagement, alone or in combination, of the lockup clutch and braking clutch assembly. An electric torque converter configured as noted above is also provided, and may include an electrically-actuated band for grounding the engine during certain operating modes.

18 Claims, 2 Drawing Sheets

Fig-3    To [18]

| MODE | 24 | 26 | 25 | 23 |
|---|---|---|---|---|
| 1 (Engine Off) | -- | O | O | |
| 2 (EV Launch) | 16 | O | O | X |
| 3 (EV Drive) | 16 | O | X | X |
| 4 (EV / Engine On) | 16 | Slip | O | Over Run |
| 5 (Engine Drive) | 12 | X | O | Over Run |
| 6 (Key Start) | 12 | O | O | Over Run |
| 7 (Engine Start on Grade) | 12 | O | O | |
| 8 (Re Gen / Engine On) | 12 | X | O | Over Run |
| 9 (Re Gen / EV) | 16 | O | X | X |
| 10 (Coast Braking) | 12 | X | O | |

ELECTRIC TORQUE CONVERTER WITH DUAL-DRIVEN MAIN PUMP

TECHNICAL FIELD

The present invention relates to a hybrid vehicle having an electric torque converter assembly.

BACKGROUND

Hybrid electric vehicles (HEV) can selectively utilize different power sources to optimize fuel economy. The power sources are typically an internal combustion engine and a high-voltage electric motor/generator unit (MGU), or multiple MGUs, and may be arranged in series or in parallel with respect to each other to provide various vehicle operating modes. In a hybrid vehicle, the engine can be automatically turned off whenever the HEV is at a standstill or while coasting to minimize idle fuel consumption, and can be quickly restarted via the MGU or an auxiliary starter motor when a driver of the HEV requests forward or reverse travel, e.g., by depressing an accelerator pedal.

In an automatic transmission, a hydrodynamic torque converter replaces a mechanical friction clutch for the purpose of transferring input torque from either or both power sources to an input member of the transmission. A torque converter assembly thus provides a fluid coupling between power sources and the transmission, while also multiplying torque at low vehicle speeds and providing a mechanical connection for efficiency via an internal friction clutch. In some vehicle designs, an electric torque converter assembly may be used in lieu of a hydrodynamic torque converter to replace certain hydraulic components of the latter with electro-mechanical devices, while still providing a similar level of input coupling and torque multiplication.

SUMMARY OF THE INVENTION

Accordingly, a vehicle as set forth herein includes an electric motor/generator unit (MGU), an internal combustion engine, a transmission with an input member rotatable via the engine and/or MGU depending on the mode, and an electric torque converter assembly having a pump. The electric torque converter assembly also includes a braking clutch assembly that selectively connects the engine to a stationary member for grounding of the engine, a lockup clutch, and a dual-pinion planetary gear set having first, second, and third members. The pump is driven through the gear set by the faster of the engine and MGU, and via a selective engagement one of two passive one-way clutches, either alone or in combination with each other.

An electric torque converter assembly is also provided that includes a braking clutch assembly adapted to selectively connect the engine to a stationary member, a pump in driving connection with an input member of the transmission, a dual-pinion planetary gear set, and a lockup clutch adapted for selectively locking all members of the gear set for common rotation. As noted above, the electric torque converter assembly drives the pump through the gear set during predetermined operating modes using the faster of the engine and the MGU and a selective engagement, alone or in combination, of one of two passive one-way devices. In one embodiment, inertia torque from the MGU transfers through the gear set to the engine to assist in engine cranking when the MGU is decelerating.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic illustration of an electric torque converter assembly having a dual-pinion planetary gear set that is usable as an embodiment of the gear set shown in FIG. 2.

DETAILED DESCRIPTION

Figure 1:
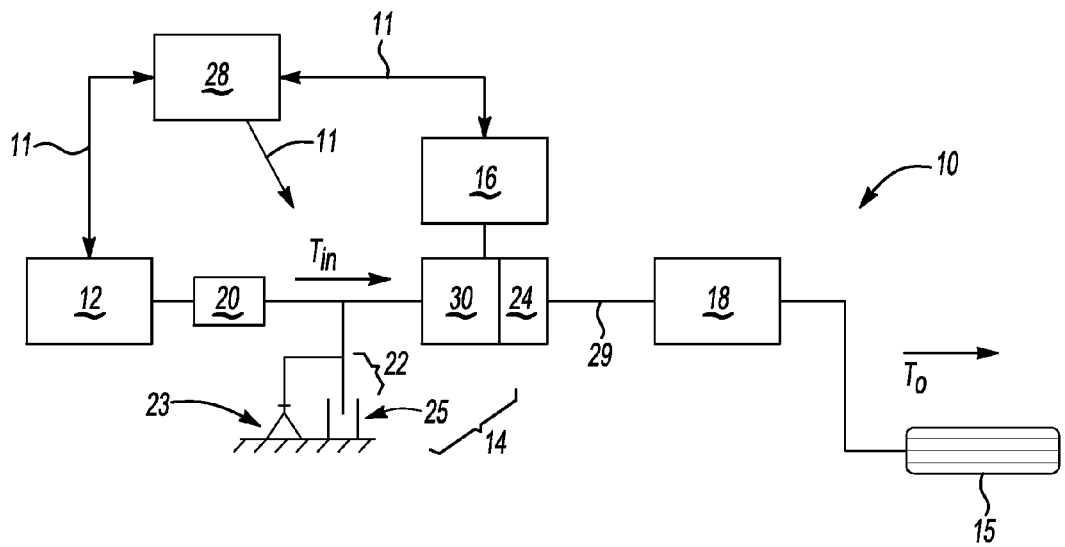
FIG. 1 is a schematic illustration of a vehicle configured with an electric torque converter assembly in accordance with the present invention.

Referring to the drawings, wherein like reference numbers correspond to like or similar components throughout the several figures, a hybrid electric vehicle 10 is shown in FIG. 1. Vehicle 10 includes an internal combustion engine 12, an electric torque converter assembly 14, an electric motor/generator unit (MGU) 16, and a transmission 18. While not shown in FIG. 1 for simplicity, the MGU 16 is electrically connected to an energy storage system, e.g., a rechargeable battery, via a power inverter module, and adapted to selectively draw power from and deliver power to the energy storage system as needed. Multi-direction power flow between the various components aboard vehicle 10 is controlled via one or more controllers 28 using powerflow command signals 11.

Figure 4:
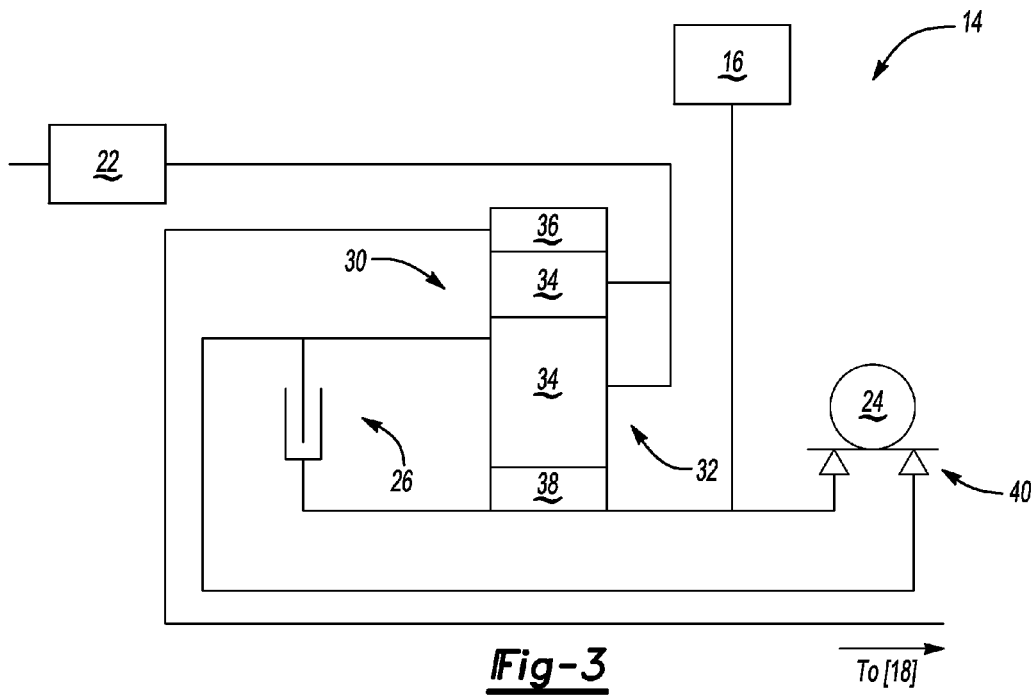
FIG. 4 is a table describing the various possible operating modes of the vehicle shown in FIG. 1

Vehicle 10 may be powered by either/both of the engine 12 and MGU 16 to provide a plurality of different operating modes, such as the ten different operating modes as detailed in FIG. 4. An engine damper 20, e.g., an external dry damper and flex plate arrangement may be connected to the output side of the engine 12 as shown to damp the effects of engine noise or vibration during engine start and operation. Output torque (arrow $T_O$) from transmission 18 is ultimately transferred to a set of road wheels 15 to propel the vehicle 10.

Electric torque converter assembly 14 includes a brake assembly 22 and a pump 24. An input member 29 of transmission 18 is driven through a dual-pinion planetary gear set 30 using input torque ($T_{IN}$) from one of the engine 12 or MGU 16. Brake assembly 22 may include a freewheeling element or a one-way clutch 23 and a braking clutch 25, shown schematically in FIG. 1 as a set of clutch plates, but which may be embodied as any suitable brake. For example, in one embodiment the braking clutch 25 may be configured as an electrically-applied band, e.g., across a rotatable input hub from damper 20, or any other configuration suitable for use as an engine-grounding clutch. Brake assembly 22 is adapted to provide low losses and a minimal impact on any hydraulics used in transmission 18. The inclusion of one-way clutch 23 at the position shown in FIG. 1 may simplify engine starting control complexity. For example, during an engine starting event, control is required only of a clutch 26 (see FIG. 3) and MGU 16.

Transmission 18 is selectively driven by gearset 30 (see FIG. 3) which is an integral part of the electric torque converter assembly 14 as described below. Controller 28 is therefore adapted for controlling the electric torque converter assembly 14 in order to provide a plurality of different vehicle operating modes, including at least one electric-only (EV)

mode as set forth in table 50 of FIG. 4, and to ensure that the pump 24 is driven by the faster of the engine 12 and the MGU 16 during certain predetermined operating modes. That is, when the MGU 16 operates as a generator, e.g., during an energy regenerating event, the engine 12 may drive the pump 24 in one manner through the gear set 30. Likewise, when the engine is off the MGU is available for driving the pump 24 through the gear set 30 in another manner. Gear set 30, as shown in detail in FIG. 3 and described below, thus allows its engine node to reach the pump 24, and also permits inertia torque from MGU 16 to transfer to the engine 12 when the MGU is decelerating, thereby assisting in the cranking and starting of the engine.

Controller 28 may be configured as a digital computer having a microprocessor or central processing unit, read only memory (ROM), random access memory (RAM), electrically-erasable programmable read only memory (EEPROM), high speed clock, analog to digital (A/D) and digital to analog (D/A) circuitry, and input/output circuitry and devices (I/O), as well as appropriate signal conditioning and buffer circuitry. Any algorithms resident in the controller 14 or accessible thereby can be stored in ROM and automatically executed by the controller to provide the respective functionality.

Figure 2:
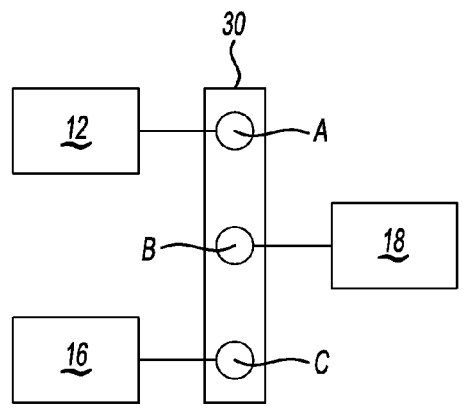
FIG. 2 is a schematic lever diagram for a planetary gear set usable within the vehicle of FIG. 1.

Referring to FIG. 2 in conjunction with FIG. 1, the dual-pinion planetary gear set 30 noted above is shown in schematic lever diagram form to include three nodes, respectively labeled A, B, and C. Node A is connected to the engine 12, which may be via the damper 20 in the embodiment shown in FIG. 1. Node B is connected to the transmission 18. Node C is connected to the MGU 16. Gear set 30 allows pump 24 of FIGS. 1 and 4 to be driven by either of nodes A and C, which may be a ring gear or a carrier member according to one possible embodiment, although other configurations are also possible.

Using this configuration, the pump 24 is allowed to run at a relatively fast rate under certain predetermined operating conditions or modes, such as at idle, which can help to minimize sizing requirements for the pump, as well as avoiding the need for a second, electrically driven pump often present in hybrid systems and referred to as an auxiliary pump. The gear set 30 also provides sufficient gear reduction for the pump 24, thus allowing the pump to be driven at a high ratio relative to the axle, e.g., a ratio of approximately 42:1, when desirable at low vehicle speeds, versus approximately 18:1 at higher speeds and in conventional automatic transmission designs.

Referring to FIG. 3, the electric torque converter assembly 14 of FIG. 1 includes the dual-pinion planetary gear set 30 noted above, i.e., a planetary gear set having a carrier member 32 with two sets of pinion gears 34 as shown. Gear set 30 includes a ring gear 36 and a sun gear 38, which are rotatably supported by the carrier member 32. Within the electric torque converter assembly 14, gear set 30 is connected to a lockup clutch 26, which is selectively engagable in response to signals 11 from controller 28, as shown in FIG. 1, to selectively lock the carrier member 32, ring gear 36, and sun gear 38 together for common rotation. Gear set 30 ultimately transfers input torque generated by engine 12 and/or MGU 16 (see FIG. 1) to the pump 24 and transmission 18, also shown in the same figure. A pair of one-way clutches 40 may be connected to opposite sides of the lockup clutch 26 and positioned between the gear set 30 and the pump 24 such that the pump is driven through at least one of the one-way clutches 40. This configuration provides dual-drive capabilities, or a driving of pump 24 via the engine 12 and/or the MGU 16.

In one possible embodiment, the MGU 16 may be placed off-axis with respect to the transmission 18 for enhanced packaging, e.g., for added space when the present invention is to be implemented in a front wheel drive vehicle. However, on-axis configurations are also within the scope of the present invention.

Referring to FIG. 4, a table 50 describes the various possible operating modes, i.e., Modes 1-10, using the brake assembly 22, the electric torque converter assembly 14, and the lockup clutch 26 shown in FIG. 2. The various modes allow the pump 24 of FIGS. 1 and 2 to be driven by engine 12, i.e., Modes 5-8 and 10, and via the MGU 16, i.e., Modes 2-4 and 9. In Mode 1 the pump 24 is not driven, the engine 12 is off, and no hydraulic pressure is required.

Motor-Driven Pump Modes

Beginning with Mode 1, i.e., idle/engine off, and with reference to the structure shown in FIGS. 1 and 2, one-way clutch 23, braking clutch 25, and lockup clutch 26 are all released. With engine 12 off, the pump 24 is thus not driven, or may be driven via the MGU 16. The transmission 18 of FIG. 1 remains idle if pump 24 is not otherwise driven in this mode.

To enter Mode 2, i.e., electric vehicle (EV) launch, the one-way clutch 23 is engaged or locked to prevent freewheeling, and pump 24 is directly driven by MGU 16. Lockup clutch 26 may be allowed a limited amount of slip up to a threshold speed, e.g., approximately 1.5 MPH, to maintain pump speed at a threshold speed, e.g., approximately 800 RPM in one embodiment. Or, one may utilize a small auxiliary pump (not shown) in this mode for EV-only operation.

To enter Mode 3, i.e., EV drive, the braking clutch 25 is applied or engaged while one-way clutch 23 remains engaged. Slip across lockup clutch 26 may be controlled as needed in this mode to provide the desired output. EV drive through the planetary gear set 30 in Mode 3 may allow, via gear reduction, a substantially reduced motor torque requirement, which in turn may enable MGU 16 to take on a reduced size. Mode 4, i.e., EV/engine on, can be entered by continuing to allow lockup clutch 26 to slip while braking clutch 25 is released. One-way clutch 23 is allowed to overrun.

For Mode 9, i.e., regenerative braking/EV mode, the lockup clutch 26 is fully released, and braking clutch 25 is engaged, with one-way clutch 23 being engaged or locked.

Engine-Driven Pump Modes

Modes 5-8 and 9 of FIG. 3 allow pump 24 to be driven by the engine 12 through the planetary gear set 30 of FIG. 2. Beginning with Mode 5, i.e., engine drive/parallel, the lockup clutch 26 is fully engaged, braking clutch 25 is released, and one-way clutch 23 is allowed to overrun.

Modes 6 and 7 allow for a key-based start of the engine 12, i.e., by drawing power from an auxiliary starter motor (not shown), on a level surface and on a grade, respectively. Mode 6 differs from Mode 5 in that lockup clutch 26 is fully released in Mode 6, and is fully engaged in Mode 5. If an auxiliary starter motor is not present, the engine 12 may be started by operation of the MGU 16 and application of the lockup clutch 26 while the transmission 18 is in a neutral condition, e.g., during a typical key start.

For Mode 7, the decelerating MGU 16 can supplement torque needed to start engine 12. This capability may be used to reduce the electrical power required from the battery, or the electromagnetic torque required from the motor, or both. In Mode 8, energy regeneration is enabled by applying friction elements 25 and allowing the freewheeling element 23 to overrun.

Those of ordinary skill in the art will recognize the potential competitive benefits of the vehicle 10 shown in FIG. 1. By using the electric torque converter assembly 14 with two clutches, i.e., brake assembly 22 of FIG. 1 and lockup clutch

26 of FIG. 2, and one planetary gear set 30 as shown in FIG. 2. The pump 24 can be driven by the faster of the engine 12 and MGU 16, as noted above, thus optimizing pump capacity, enabling the pump to run fast at idle. By locking up the pump 24 via the lockup clutch 26 at lower speeds, an increased ratio of approximately 42:1 can be realized versus approximately 18:1 of conventional designs.

Additionally, the present invention enabled inertia torque from the MGU 16 to be used for engine starting, as noted above, with the configuration set forth herein reducing the electrical power overhead needed for "flying" engine starts (engine starts while the vehicle is moving). Using motor inertia to start the engine 12, starting requirements may be reduced. For example, if a conventional start requires 15 kW of power, and if this number may be reduced to approximately 5 kW of power in one embodiment, the additional 10 kW of power is available to power the vehicle 10 without requiring a larger battery.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
 an electric motor/generator unit (MGU);
 an internal combustion engine;
 a transmission having an input member that is alternatively rotatable via the engine and the MGU; and
 an electric torque converter assembly having:
  a pump;
  a braking clutch assembly that selectively connects the engine to a stationary member;
  a dual-pinion planetary gear set having first, second, and third members respectively connected to a different one of the transmission, the engine, and the MGU; and
  a lockup clutch adapted for locking the first, the second, and the third members of the gear set for common rotation;
 wherein the pump is driven through the gear set by the faster of the engine and MGU in predetermined operating modes of the vehicle using a selective engagement of the lockup clutch and braking clutch assembly, either alone or in combination with each other.

2. The vehicle of claim 1, wherein the electric torque converter assembly is configured to selectively allow inertia torque from the MGU to transfer to the engine through the gear set to assist in cranking of the engine when the MGU is decelerating.

3. The vehicle of claim 1, wherein the vehicle has an electric-only (EV) launch mode, an EV drive mode, and a regenerating mode, and wherein the braking assembly includes a one-way clutch that is engaged during each of the EV launch, EV drive, and regenerating modes.

4. The vehicle of claim 3, wherein the engine is grounded via an engagement of the braking assembly during the EV drive mode and the regenerating mode.

5. The vehicle of claim 1, further comprising: a pair of one-way clutches each connected to opposite sides of the lockup clutch, and positioned between the gear set and the pump such that the pump is driven through at least one of the pair of one-way clutches.

6. The vehicle of claim 1, further comprising an external dry damper and flex plate arrangement positioned between the engine and the braking assembly.

7. An electric torque converter assembly for use in a vehicle having an electric motor/generator unit (MGU), an internal combustion engine, and a transmission having an input member that is alternatively rotatable via the engine and the MGU, the electric torque converter assembly comprising:
 a pump;
 a braking clutch assembly adapted to selectively connect the engine to a stationary member;
 a dual-pinion planetary gear set having first, second, and third members each connected to a different one of the transmission, the engine, and the MGU; and
 a lockup clutch adapted for selectively locking the gear set for common rotation of the first, the second, and the third members;
 wherein the torque converter assembly is configured for driving the pump through the gear set during predetermined operating modes of the vehicle using the faster of the engine and the MGU and using a selective engagement of the lockup clutch and braking clutch assembly, either alone or in combination with each other.

8. The electric torque converter assembly of claim 7, wherein the electric torque converter assembly is configured to selectively allow inertia torque from the MGU to transfer to the engine through the gear set to assist in cranking of the engine when the MGU is decelerating.

9. The electric torque converter assembly of claim 7, wherein the vehicle has an electric-only (EV) launch mode, an EV drive mode, and an energy regenerating mode, and wherein the braking assembly includes a one-way clutch that is engageable during each of the EV launch, EV drive, and energy regenerating modes.

10. The electric torque converter assembly of claim 9, wherein the braking assembly further includes a band adapted for grounding the engine during the EV drive and the energy regenerating modes.

11. The electric torque converter assembly of claim 7, further comprising a pair of one-way clutches each connected to opposite sides of the lockup clutch, and positioned between the gear set and the pump such that the pump is driven through at least one of the pair of one-way clutches.

12. The electric torque converter assembly of claim 7, further comprising an external dry damper and flex plate arrangement positioned between the engine and the braking assembly.

13. An electric torque converter assembly for use in a vehicle having an electric motor/generator unit (MGU), an internal combustion engine, and a transmission having an input member that is alternatively rotatable via the engine and the MGU, the electric torque converter assembly comprising:
 a planetary gear set having a sun gear connected to the MGU, a ring gear connected to the transmission, and a carrier member having a first and a second pinion gear;
 a braking clutch assembly adapted to selectively ground the engine, wherein the braking clutch assembly is a one-way clutch connected in parallel with an electrically-applied band;
 a pump in driving connection with the input member, and alternatively drivable via the ring gear and the carrier member; and
 a lockup clutch adapted for selectively locking the gear set such that the ring gear, the sun gear, and the carrier member rotate in unison with each other;
 wherein the electric torque converter assembly is configured to drive the pump through the gear set during predetermined operating modes of the vehicle using the faster of the engine and the MGU and a selective engagement of the lockup clutch and the braking clutch assembly, either alone or in combination with each other.

14. The electric torque converter assembly of claim 13, wherein the electric torque converter assembly is configured to selectively allow inertia torque from the MGU to transfer to the engine through the gear set to assist in cranking of the engine while the MGU is decelerating.

15. The electric torque converter assembly of claim 13, wherein the vehicle has an electric-only (EV) launch mode, an EV drive mode, and an energy regenerating mode, and wherein the braking assembly includes a one-way clutch that is engaged during each of the EV launch, EV drive, and regenerating modes.

16. The electric torque converter assembly of claim 13, wherein the engine is grounded via an engagement of the braking assembly during each of the EV drive and the regenerating modes.

17. The electric torque converter assembly of claim 13, further comprising a pair of one-way clutches each connected to opposite sides of the lockup clutch, and positioned between the gear set and the pump such that the pump is driven through at least one of the pair of one-way clutches.

18. The electric torque converter assembly of claim 13, further comprising an external dry damper and flex plate arrangement positioned between the engine and the braking assembly.

* * * * *